April 17, 1934.　　　　J. H. HARVEY　　　　1,955,497
SOUND RECORDING AND REPRODUCING APPARATUS FOR
USE IN CONNECTION WITH MOTION PICTURES
Filed Oct. 1, 1928　　　5 Sheets-Sheet 1
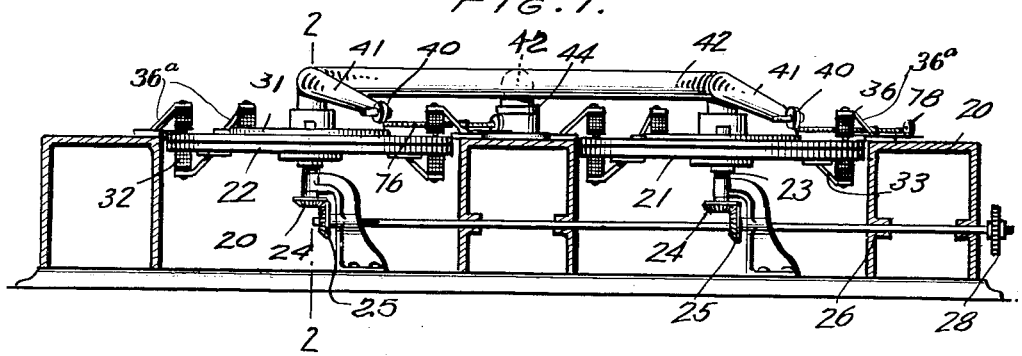
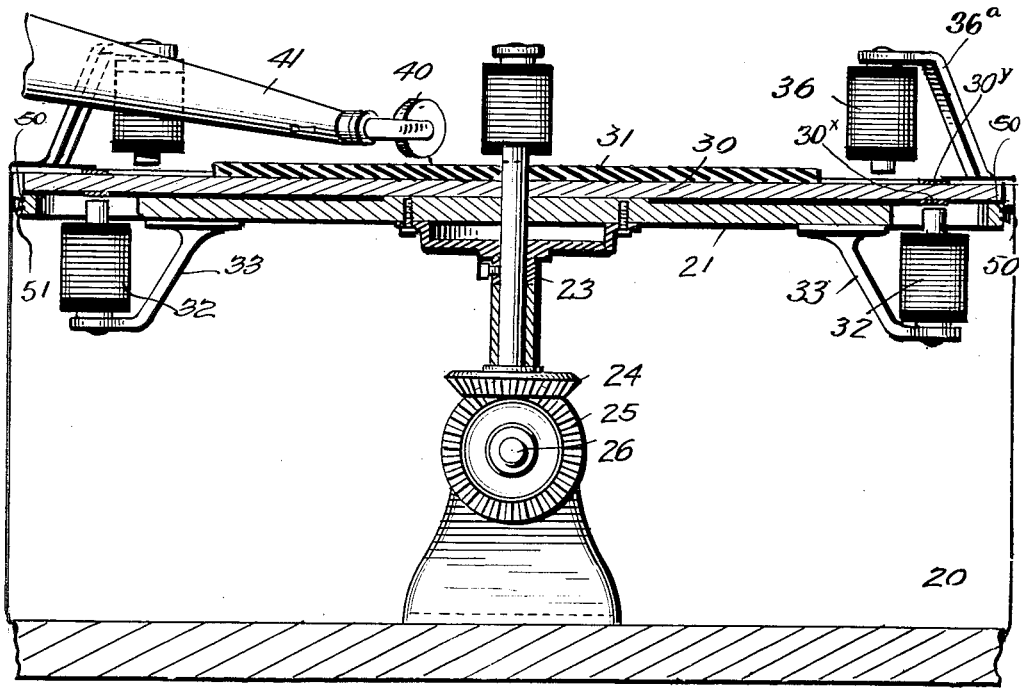
Inventor
JONAS H. HARVEY Inventor
JONAS H. HARVEY April 17, 1934.  J. H. HARVEY  1,955,497
SOUND RECORDING AND REPRODUCING APPARATUS FOR
USE IN CONNECTION WITH MOTION PICTURES
Filed Oct. 1, 1928   5 Sheets-Sheet 3

Inventor
JONAS H. HARVEY
Eugene E. Stevens
Attorneys

April 17, 1934. J. H. HARVEY 1,955,497
SOUND RECORDING AND REPRODUCING APPARATUS FOR
USE IN CONNECTION WITH MOTION PICTURES
Filed Oct. 1, 1928 5 Sheets-Sheet 4
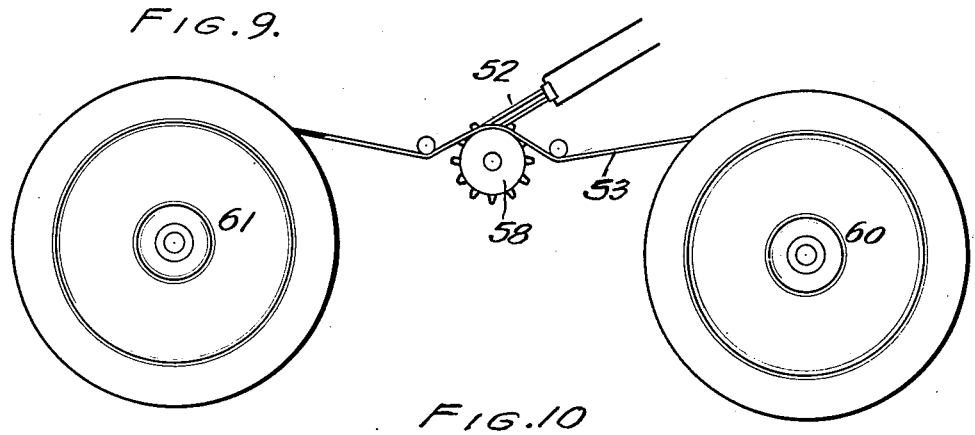
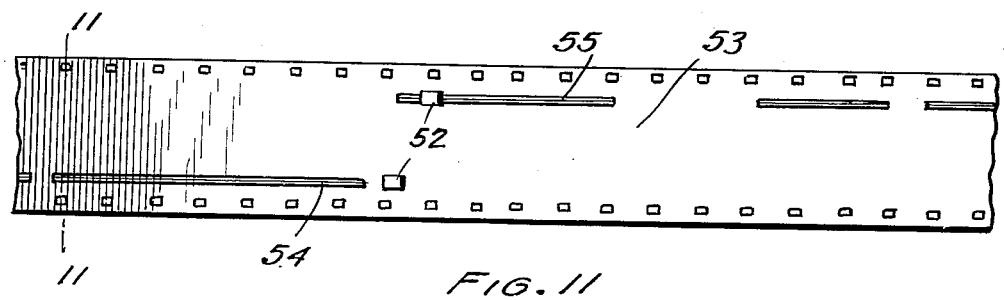
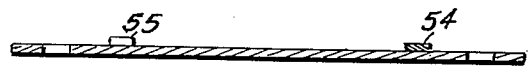
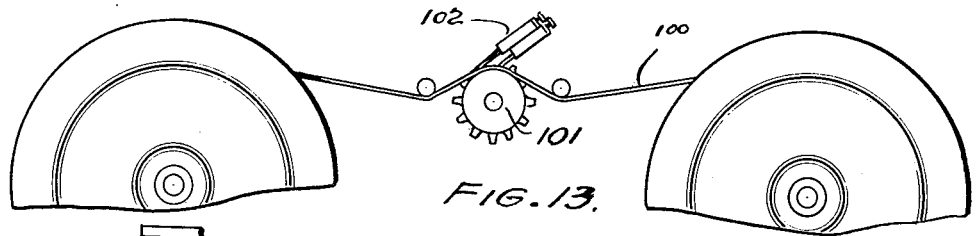
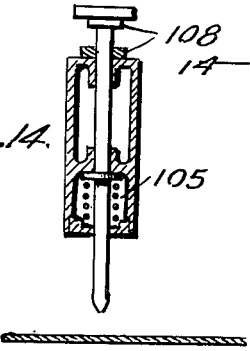
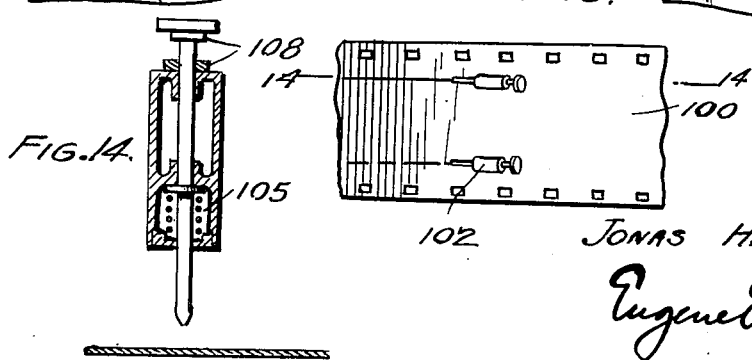
Inventor
JONAS H. HARVEY
Eugene E. Stevens
Attorneys

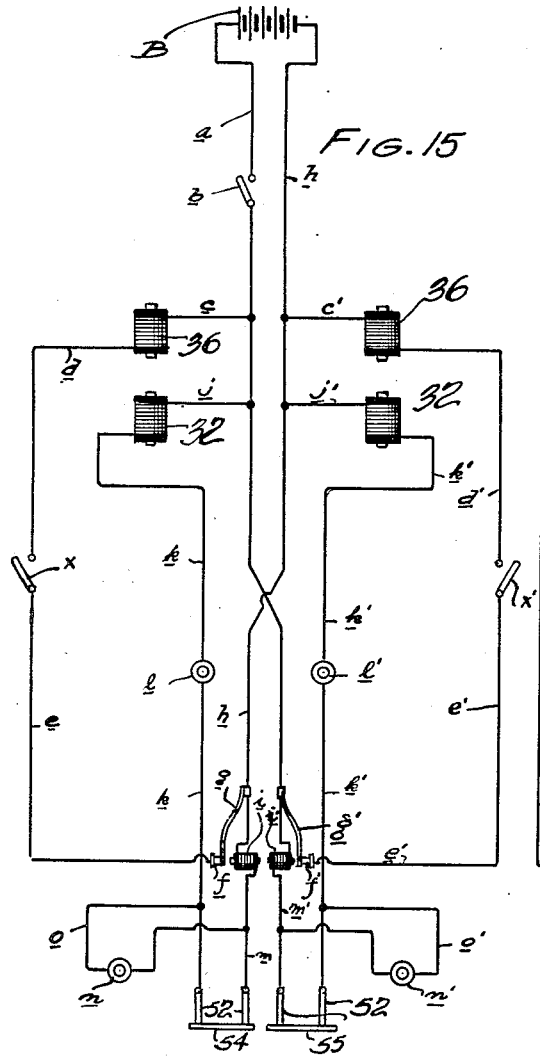
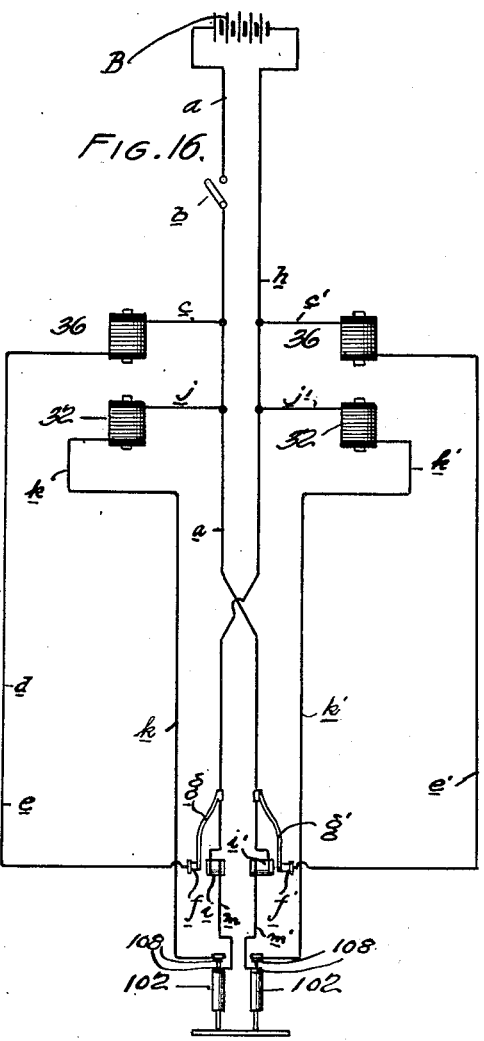
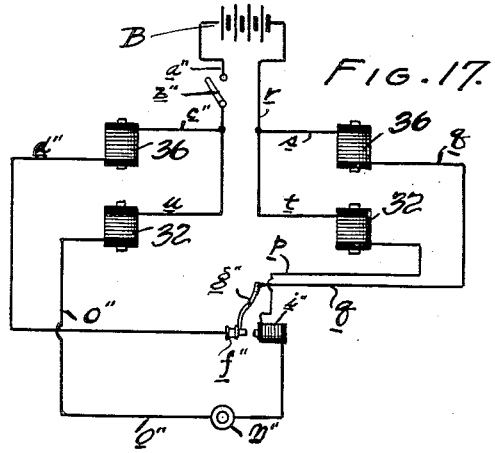
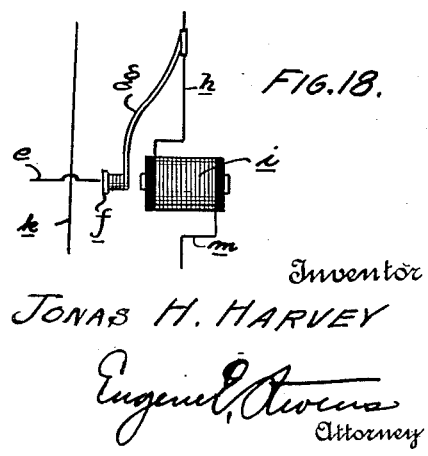

Patented Apr. 17, 1934

1,955,497

UNITED STATES PATENT OFFICE 1,955,497

SOUND RECORDING AND REPRODUCING APPARATUS FOR USE IN CONNECTION WITH MOTION PICTURES

Jonas H. Harvey, Los Angeles, Calif.

Application October 1, 1928, Serial No. 309,416

9 Claims. (Cl. 274—10)

This invention relates to sound recording and reproducing devices especially adapted for use in connection with motion pictures.

Briefly stated, an important object of this invention is to provide a phonographic apparatus which provides an audible accompaniment for motion pictures so that the pictures shown on a screen will be more fully explained and rendered more instructive or entertaining as the case may be.

More specifically, the invention forming the subject matter of this application is provided with novel means whereby the auditory accompaniment may be extended over a long period to correspond to the present day multi-reel pictures and the invention is also provided with means whereby the auditory accompaniment may be accurately synchronized with the picture and operated either constantly or at intervals as may be required by the character of the picture.

Also an important aim of this invention is to provide an auditory accompaniment device for motion pictures in which the records may be made while the picture is being taken or in case the actors before the camera do not possess voices suitable for public reproduction or are unable to speak the required language the vocal accompaniment may be prepared before or after the taking of the picture and this vocal accompaniment may be rendered by those having the necessary vocal qualities.

A further and equally important object of the invention is to provide simple means whereby portions of the auditory accompaniment may be deleted and a corrected rendition substituted therefor, all without disturbing that part of the auditory accompaniment which is regarded as acceptable.

A still further and equally important object of the invention is to provide means whereby the original records will function in perfect synchronism with film that, through wear and accident, has been shortened and patched, accomplishing this important object without the slightest interruption in the projecting of the reel.

Other objects and advantages will be apparent during the course of the following description.

In the accompanying drawings forming a part of this application and in which like numerals are employed to designate like parts throughout the same, Figure 1 is a side elevation of the improved phonograph, parts being shown in section;

Figure 2 is a vertical sectional view taken on line 2—2 of Figure 1;

Figure 9 is a fragmentary plan view illustrating the means by which an electric circuit is closed through the magnets carried by the platen whereby the disk supporting plate carried by the platen is caused to rotate with the platen when sound is to be reproduced;

Figure 10 is a fragmentary plan view of a tape embodied invention, which tape is illustrated in edge elevation in Figure 9;

Figure 11 is a transverse sectional view taken on line 11—11 of Figure 10;

Figure 12 is a fragmentary side elevation illustrating the tape and the means to originally mark the same preparatory to the application of electric contacts thereto;

Figure 13 is a fragmentary plan view of the tape and marking means therefor illustrated in Figure 12;

Figure 14 is a vertical sectional view through the marking and circuit closing device employed for marking the tape shown in Figure 12 and 13 and for closing a circuit whereby the sound recording device is caused to operate;

Figure 15 is a diagram illustrating the means for controlling the circuits through the magnets associated with the sound reproducing device;

Figure 16 is a diagram of a circuit employed in connection with the recording of the auditory accompaniment;

Figure 17 is a diagram of a circuit employed in connection with the synchronizing mechanism, and, Figure 18 is a diagram of a switching mechanism, by means of which the current is switched from one set of plate holding magnets to another set of plate holding magnets.

Figures 3, 4:
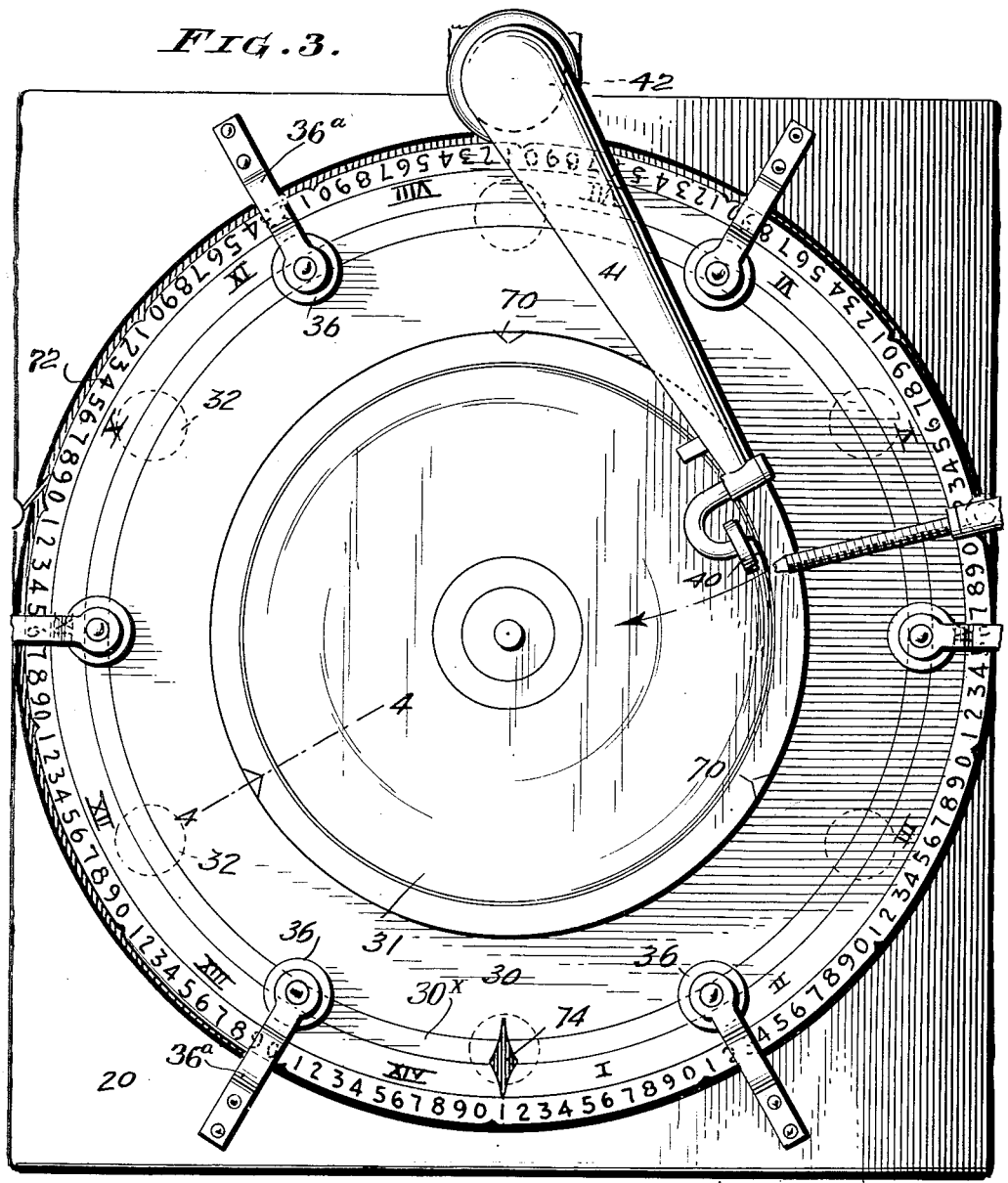
Figure 3 is a plan view illustrating one of the sound reproducing records and associated parts.
Figure 4 is a detail sectional view taken on line 4—4 of Figure 3.

The invention forming the subject matter of this application may be employed in connection with any projecting or moving picture machine of accepted design and in Figure 1, I have illustrated a support or base 20 upon which separate platens 21 and 22 are rotatable. Figure 1 illustrates that two platens 21 and 22 are provided with shafts 23 having pinions 24 which mesh with pinions 25 on a drive shaft 26. The drive shaft 26 is in turn provided with a gear, a sprocket wheel or other driving means 28 which may be driven from the motion picture machine at the same speed as the motion picture machine. However, a separate driving mechanism may be employed for the shaft 26, it being necessary only to have the shaft 26 turn at the proper speed. At this point it is important to note that the separate platens 21 and 22 turn during the entire operation of the invention and the motion picture machine.

Referring now to Figure 2, it will be seen that each platen 21 supports a plate 30 upon which a sound reproducing disk 31 is mounted. The disk 31 turns with the plate 30 and when the plate 30 has a driving connection with the platen, upon which it is mounted, the disk 31 will turn with the platen. This driving connection between the platen and the plate 30 is established by a plurality of magnets 32 connected by brackets 33 to the platen and arranged in opposition to a metallic ring $30^x$ embedded in the bottom of plate 30. The magnets 32 are spaced about the platen and when energized, these magnets hold the plates down on the platens so as to cause the plates to turn with the platens. When the supply of current through the magnets 32 is cut off it will travel through a series of magnets 36 carried by brackets $36^a$ secured to the base 20. Energization of magnets 36 causes the plate 30 to be drawn up out of driving engagement with the platen, it being observed that there is a metallic ring $30^y$ embedded in the top surface of the plate 30 opposite the magnets 36. Therefore, when the magnets 36 are energized they will pull the plate 30 up and the disk 31 which contains the record to be reproduced will cease to turn. Obviously, the plate 30 may be all metal, but for the sake of lightness I prefer to make it of other lighter material using metallic rings $30^x$, $30^y$ opposite the magnets 32, 36.

In accordance with this invention the disk 31 is turned only when the auditory accompaniment is to take place and when there is an interruption in the auditory accompaniment the disk 31 is stopped.

This arrangement permits the sound reproducing needle of the reproducer 40 to remain in constant engagement with the disk 31 whereby to assure proper contact of the needle with the record and to prevent the needle from getting out of the proper groove. This is an important feature of the invention. Each reproducer 40 is carried by a tone arm 41 which communicates with what might be said to be a manifold 42. The manifold 42 is connected with a microphone 44 and the electric wires connected to the member 44 provide a means whereby the sound which is reproduced may be given out at a remote point or points by the aid of an amplifying horn or the like.

The magnets 32 have electrical connection with contact rings or strips 51 carried by the edge or under side of the platen and the contact strips 50 which are insulated from each other are engaged by brushes 50 and the brushes 50 have electrical connection with a second set of brushes 52. Figure 10 illustrates that the pairs of brushes 52 engage a strip 53 which carries spaced rows of contacts 54 and 55.

It is important to note that there are two platens, two disks, and two plates for supporting the disks and when one disk is being turned for providing an auditory accompaniment the other disk is held against movement and when the brushes 52 of one of the disks are engaged with the associated contacts on the strip 53 the magnets of a particular platen are energized so as to establish a driving connection between one of the plates 30 and the associated platen. In summarizing, it will be seen that when one of the pairs of brushes 52 are engaged by one of the rows 54 of contacts the other pair of brushes 52 will be inactive. That is to say, no metallic contacts 54 will be presented to both pairs of brushes 52 at the same time. This brings about the completion of the record on one of the disks before the reproduction of sound recorded on the other disk takes place. Or, if the film has been shortened and patched, the first record will play in synchronism with the picture to the place of the break in the film and the second record, whose reproducing needle has been previously adjusted to the proper point so as to cut out that part of the record corresponding to the film which has been discarded, will continue the reproduction of sound in synchronism with the picture. The strip 53 which will be of substantially the same length as the film as will be hereinafter apparent, may be trained over a sprocket wheel 58 driven at the same speed as the motion picture machine and the strip may be connected to reels 60 and 61.

Assuming that the machine is in operation for reproducing a previously recorded record, the sprocket wheel 58 will be turned for presenting the contacts 54 singly to the brushes 52. When one of the rows of contacts 54 is presented to the associated pair of brushes 52 an electric current will be set up in one set of the magnets 32 to start one of the disks 31 turning. When one of disks 31 turns the sound is reproduced through the reproducing head 40 and the tone arm 41 and when the auditory accompaniment is over for the moment, the disk 31 will stop. This stopping of the disk 31 is brought about by the passage of a particular contact 54 past one pair of the brushes 52. It is thus seen that the disk 31 will turn only when an auditory accompaniment is to take place.

When the auditory accompaniment on the first disk is exhausted the second row of contacts 55 will appear on the strip 53 and the magnets 32 of the second phonograph platen will be energized. That is to say, the second pair of brushes 52 will be engaged by the row of contacts 55 and the turning of the plate 30 and disk 31 of the second platen will take place, either constantly or at intervals.

At the present stage of the art a phonograph record can be made to play for an entire reel of film, therefore it is not absolutely necessary that the machine operate as described in the last paragraph. But since it is possible that it may be desirable to use records that play for a shorter duration of time, it is considered best to describe this method of operation. With reference to the foregoing description it will be seen that when one record is exhausted the turning of the other record automatically takes place thereby leaving the first record free for replacement. As the reel continues the second record will eventually become exhausted and the reproduction of the auditory accompaniment will take place by way of a new disk which has been placed upon the first platen. This cycle of operation is continued until the picture has been fully shown or at least until the completion of that part of the picture which is to have an auditory accompaniment.

If, instead of using short time records, a record is used which will play for an entire reel of film, the following method of operation is employed. Two records which have the same sound engraved upon their surfaces, that is, two identical records, are placed upon the phonographs. If the reel of film is unbroken only one record is necessary. It will play for the entire projecting of the reel of film. If, however, the film has been shortened and patched, both records will be necessary to carry on the synchronism of sound and picture without any interruption in the performance. The first row of contacts 54 take care of the entire playing of the record for one reel of film, providing the film has not been shortened and patched. If the film has been shortened the tape 53 must be shortened in exactly the same way. The contacts 55 now control the playing of the second record, which record continues the sound for the picture where the first record left off. Instead of having two sets of contacts 54 and 55 only one set of contacts 54 may be used to control the playing of both records. When the film is shortened and patched the strip 53 is shortened in a similar manner and the last part of strip 53 is turned over so that the reverse side is uppermost. The second set of brushes 52 are so arranged that they will come in contact with the contacts 54 as the strip unwinds. Thus it is seen that by this simple means the original records accommodate themselves to cut and patched film without any interruption in the picture or accompanying sound.

Figure 5:
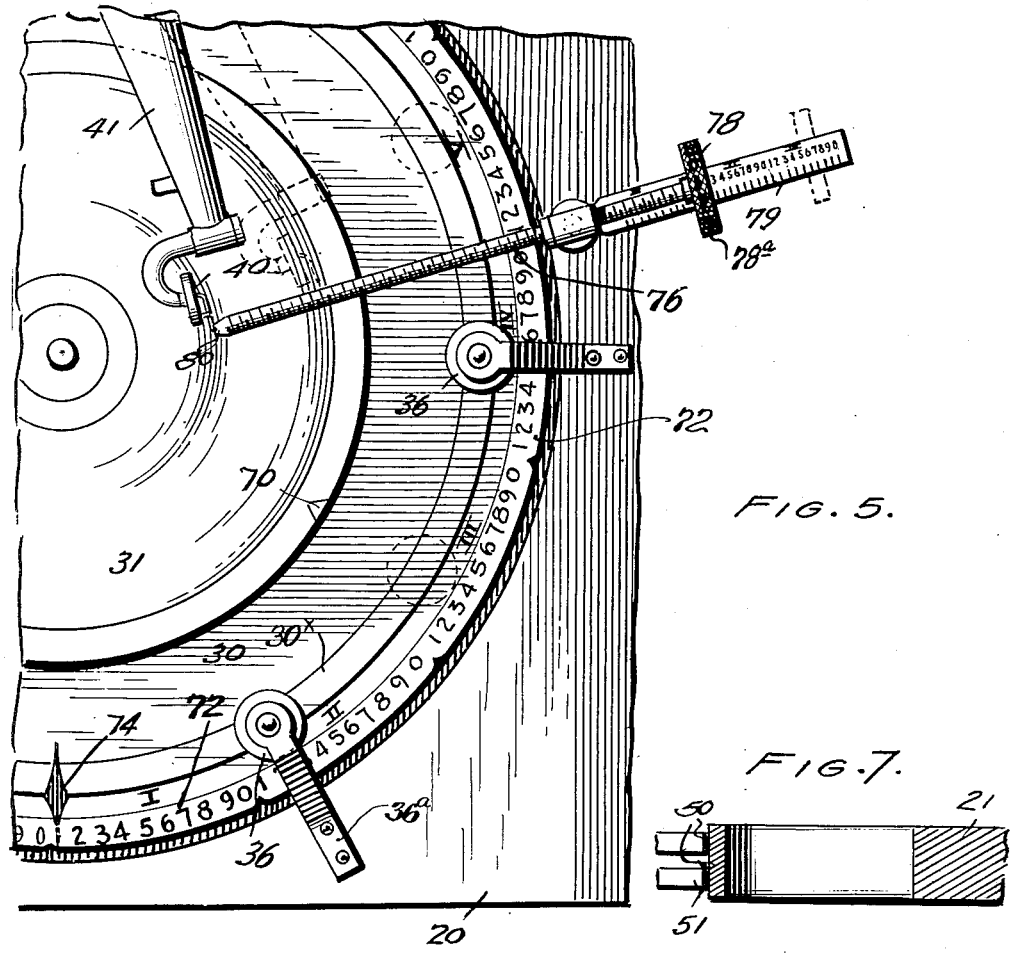
Figure 5 is a fragmentary plan view illustrating the means for setting one of the reproducing needles at the proper point on the associated disk.
Figure 7:
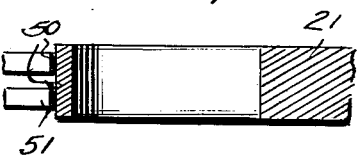
Figure 7 is a detail vertical sectional view taken on line 7—7 of Figure 6.
Figure 6:
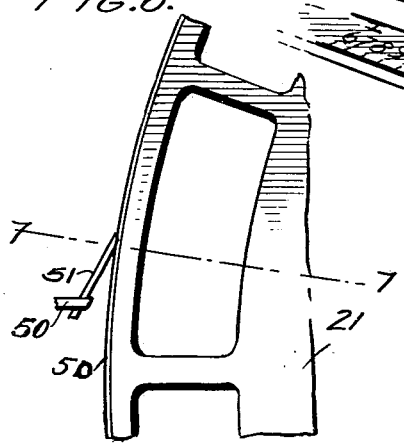
Figure 6 is a fragmentary plan view illustrating the means to establish an electrical connection between the magnets carried by and rotatable with a platen and a source of electric current.
Figure 8:
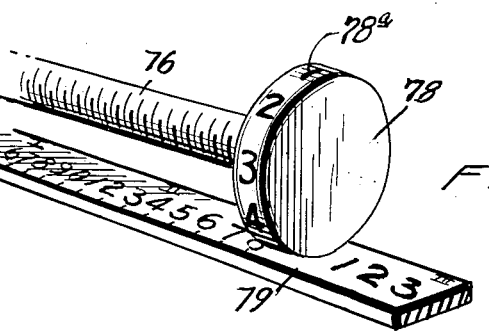
Figure 8 is a fragmentary perspective illustrating a vernier arrangement embodied in the invention.

Figures 5 and 8 illustrate means including a vernier arrangement to facilitate the placing of the needle of 40 accurately on the disk and by reference to Figure 5 it will be seen that the plate 30 may be provided with a series of knobs 70 which extend into more or less V-shaped notches in the edge portion of the disk, thus assuring accurate placement of the disk 31 on plate 30. The casing or support 20 may be provided with indicia 72 with which an indicator or pointer 74 on the plate cooperates for positioning the disk. A vernier screw 76 is provided with a handle 78 having peripheral numbers 78ª which cooperate with the numbers on a scale 79 whereby the position of the needle engaged with the notched forward end 80 of the screw may be accurately indicated. By using the transverse numbers 79 of the vernier arrangement in combination with the circumferential numbers 78ª, the exact starting point may be found on the record and the needle placed thereon, or the needle may be quickly adjusted at any time the machine is in operation if it should accidentally depart from true synchronism with the pictures. Also when the film has been shortened and patched, the needle is adjusted on the second record by the vernier arrangement so that the second record may continue on with the required sound when the first record has played as far as the break in the film. The pointer 80 on the forward end of the screw is notched and is adapted to set the needle in exactly the proper groove. By way of example it might be assumed that it is desired to reacquire the needle setting of Figure 5. All that is necessary to be done is to see that the pointer 74 is to be set at the numeral 1 of the circumferential indicia 72; also that the vernier screw 76 is turned until the graduation of numeral 2 on the scale 79 registers with the rear edge of the head 78 and the numeral 5 of the head 78 registers with a longitudinal graduation of the scale plate 79.

Figures 12, 13 and 14 illustrate a marking and circuit closing arrangement for use in connection with the recording of the audible accompaniment and by reference to these figures it will be seen that the tape, in this case designated by the numeral 100, is passed over a wheel 101 and is engaged by the markers 102 which indicate the place and extent of the electrical contacts designated by the numerals 54 and 55. The members 102 are in the nature of writing elements and when in contact with the strip 100 will form a mark thereon which indicates the exact position and length of the contacts to be placed. When the writing element 102 is manually advanced against the tension of the spring 105 a circuit is completed through the contacts 108 of a switch and the proper recording disk is turned. In this case the machine illustrated in Figure 1 may be employed and when the circuit is completed through the lower set of magnets of one of the platens, the platen is caused to turn the plate 30 upon which the record is being made. It is obvious that a single platen machine embodying the same essentials of construction may be used with the camera since ordinarily a single scene uses only a comparatively short length of film. It is thus seen that when the operator advances one of the writing elements 102 he will not only indicate the place for the electrical contacts to be attached and the extent of the contacts, but he will also start one of the record bearing plates in operation so as to record the auditory accompaniment on the disk which is turning. Whenever there is a stop in the auditory accompaniment the operator will release the element 102 and it will return to its inoperative position.

It is important to note that the auditory accompaniment or at least the vocal part of the auditory accompaniment may be rendered by the actors while appearing before the camera or in case the actors do not possess voices suited to public reproduction or where they cannot speak the required language with the necessary fluency, other characters may be employed for this purpose and the auditory accompaniment may be rendered at any time found convenient.

If a part of the auditory accompaniment is below the required standard it may be deleted during the transfer of the record from one disk to another and a corrected rendition substituted therefor.

The master or original disk may be placed upon one of the phonographs and the disk to which the matter is to be transferred is placed upon the other phonograph and the machine started. When a portion of the record which is to be deleted is reached the needle may be lifted from the master record and the corrected rendition rendered through the manifold or by way of a mouth piece provided for the purpose and thus the record on the second disk will be free from the defect of the first disk. This also provides a means whereby the auditory accompaniment may be rendered in the proper sequence. In this connection, it might be stated that in filming a picture it frequently occurs that the scenes are not taken in their proper sequence. In fact, the last scene may be taken first and all of the records made during the taking of the picture are transferred onto a new series of records which corresponds with the continuity of the finished picture. Some of the records made during the filming of the acts will be but partly filled and when transferring the record from one disk to another gaps may be avoided. That is to say, the vocal accompaniment may be rendered on the second disk in the most compact manner so that every movement of the disk will result in a reproduction of the recorded sound.

From the foregoing description it will be seen that with this construction it will not be necessary to retake entire scenes. If the acting or photography of part of a scene is not acceptable it will be necessary to retake only that part of the scene which must be reacted.

It is also clear that the scenes may not only be taken in any order but they may be taken at widely separated periods of time. Thus the director may take the various scenes at his convenience. If desired the scenes to be taken in one location may all be shot at one time and other scenes, even those to be acted in a distant foreign setting, may be taken at a future time by transporting the comparatively simple equipment necessary for recording.

A blank record is placed upon one plate. This phonograph has a recording point. The record from which the sound is to be recorded is placed upon the other plate. This phonograph has a reproducing needle. Both records are run together to the point where the deletion is to occur. Then, as shown by the wiring diagram, a button is released which causes the stationary magnets to grip the plates, thus stopping the records simultaneously. The reproducing needle of the second phonograph is now lifted. The button (possibly a telegraph key with a double contact—insuring quick action) is pressed and the revolving magnets instantly grip and revolve the records. Previous to this the faulty word or passage has been recorded on another record (it can be repeated again and again until it is perfectly right) and this record is now substituted for the second record and its contents, or rather, the corrected word or passage properly recorded on this record is recorded on the first record. After the corrected word or passage has been recorded in this manner on the first disk the key is released and the stationary magnets again grip the plates, stopping the records. The turntables are now stopped, the third record is removed and the second record is replaced. The reproducing needle of the second disk is adjusted by means of the vernier to the same point or corresponding point occupied by the recording point on the first record. The re-recording from one record to the other now continues in the manner described at the beginning of this description. The corrected rendition could be rendered directly through a mouthpiece to the first record, of course, without employing a third record, but this might not result in a perfect correction of the word or passage, and would spoil the entire record. Therefore it would be best, perhaps, to use a third record as above set forth.

It is well to note that the device also permits parts of scenes to be corrected in connection with the camera. If the photography or acting is unsatisfactory for some bit of business in a scene this particular bit of business may be re-photographed and re-recorded. In the transfer of records the records and needles are adjusted as described above. When the point is reached where it is desired to insert the record made in photographing the bit of business, the button or key is released, the machine is stopped, the second record is removed from the plate, and this third record is put in its place. The machine is now started and the button or switch is pressed for recording. When the contents of this third record has been recorded on the first record, the third record is removed and the second record is again put on the plate. The reproducer needle of the second record is now adjusted at the proper place to continue the transfer to the first disk.

Referring to Figure 15 which shows the wiring diagram as used for reproducing purposes, the current passes from the battery B through the line $a$, main cut-out switch $b$, line $c$ lifting magnets 36 above the left-hand platen, as viewed in Figure 1, passing thence through line $d$, cut-out switch $x$ for left-hand lifting magnets 36, line $e$, post $f$, spring contact $g$ and from thence through line $h$ back to the battery. This completes the circuit for the upper stationary magnets 36 of the left-hand platen assembly. The circuit for the magnets 36 above the right-hand platen assembly (Figure 1) is as follows. The circuit passes from battery B through the line $a$, main cut-out switch $b$ and thence to spring contact $g'$, fixed contact $f'$, line $e'$ through cut-out switch $x'$, magnets 36, line $c'$ and finally to line $h'$, which is connected to the other side of the battery.

The circuit of the left-hand magnets 32, which are carried by the left platen, is closed by the engagement of the brushes 52 with the contact 54 of the strip 53. Then the current passes through line $j$ from the line $a$, going through the magnets 32, line $k$, normally closed switch $l$, one brush 52, contact 54, second brush 52, line $m$, magnet $i$ and from thence to line $h$ and back to the battery B. Energization of the magnet $i$, of course, attracts the arm $g$ and breaks the circuit of the corresponding or lifting magnets 36. The circuit of the right platen assembly and which controls the lower platen-carried magnets 32 is closed when the brushes 52 are bridged by the contact strip 55 of the strip 53. The current passes through line $a$ energizing magnet $i'$ and passing out through line $m'$ to one brush 52 across to the other brush 52 and thence to magnets 32 by way of line $k'$ and the normally closed switch $l'$, the current after passing through the magnets 32 passing through the return line $h$ by way of the branch line $j'$.

As will be manifest, the normally closed switches $n$, $n'$ are adapted to manually actuate the magnets $i$, $i'$, respectively, when it is desired to step the record up a little bit should it become slightly out of synchronization with the accompanying picture. Normally switches $l$, $l'$, are adapted to momentarily open the circuits of magnets 32 in order to step the record back a trifle should it get a little ahead of the picture. In other words, if the circuit of magnet 32 is momentarily broken the record 31 will slip slightly on the plate 30 before the energization of magnets 36. Switches $x$, $x'$ in the circuits of the lifting magnets 36 enable said circuits to be broken momentarily when it is desired to have the record stepped up or advanced slightly to effect perfect synchronization with the picture. Of course, when one of the switches $x$, $x'$ is opened the plate 30 with the record 31 will drop down on the platen and will move slightly with the platen, although not gripped or engaged by the lower magnets 32, which are carried by the platen.

Switches $x$, $x'$ will of course be operated when the circuits of magnets 36 is closed and that of magnets 32 opens. Switches $n$, $n'$ will be operated under the same circumstances as above, while switches $l$, $l'$ will be operated when the circuits of magnets 32 are closed and those of magnets 36 open.

Figure 16 is the same as Figure 15, but shows the use of the markers 102 having the switch contacts 108 for closing the respective circuits of the platen-carried magnets and opening the respective circuits of the fixed magnets when the picture is being taken.

Figure 17 shows a circuit whereby the corresponding magnets of each platen set can be operated simultaneously, as for instance when it is desired to transfer matter from one record to another. For instance, the record on the left-hand platen would be operated on by a reproducing needle, while the record on the right-hand platen would be operated on by a recording needle. Normally the circuits of the upper magnets 36,— that is to say the fixed magnets,—will be closed, the current passing from the battery B through the line $a''$, switch $b''$, line $c''$, left hand magnets 36, line $d''$, post $f''$, spring contact $g''$, line $q$, right-hand magnets 36, line $s$, and thence to line $r$, which is connected to the battery. On pressing the normally open switch $n''$, the magnet $i''$ is energized drawing the arm $g''$ away from the contact $f$. This causes the current to pass through the line $a''$, $u''$, left-hand platen magnets 32,—thence through line $o''$, through normally open switch $n''$, magnet $i''$, line $p$, right-hand platen magnets 32 and through thence to the battery B by way of the lines $t$, $r$. It is believed that the foregoing will be readily apparent from the drawings in connection with the foregoing description.

Figure 18 merely is an enlarged view of the spring arm and magnet control for breaking the circuit of the upper magnets 36 which normally hold plate 30 out of driving engagement with the platen.

Having thus described the invention what is claimed is:

1. A phonographic device for use in connection with motion pictures comprising a base, exposed plate-supporting platens disposed above said base, means to simultaneously turn the platens, plates mounted on said platens, plate-attracting magnets carried by said platens, said platens being provided with circular contacts electrically connected to said magnets, and brushes connected to said contacts.

2. A phonographic apparatus for use in connection with motion pictures comprising separate platens, means for simultaneously turning the platens, plates on said platens, magnets carried by said platens for acting on said plates and thereby establishing a driving connection between said plates and said platens, means for energizing and deenergizing said magnets, separate stationarily mounted magnets for engaging said plates upon the breaking of the driving connection between said platens and said plates, and means for separately energizing said first and second named magnets.

3. A phonographic apparatus for use in connection with motion pictures comprising a plate for receiving a record disk, a record on said plate, magnets for attracting the plate and thereby holding the same against turning, means to turn the plate when said magnets are deenergized, a tone arm having a reproducer in constant engagement with the record disk on said plate, and means at a remote point for controlling the flow of current through said magnets.

4. A phonographic apparatus for use in connection with motion pictures comprising a plate for receiving a record disk, a record on said plate, magnets for attracting the plate and thereby holding the same against turning, means to turn the plate when said magnets are deenergized, a tone arm having a reproducer in constant engagement with the record disk on said plate, means at a remote point for controlling the flow of current through said magnets, and a second set of magnets for establishing a driving connection between said plate and the turning means therefor.

5. A combined sound recording and reproducing apparatus for the purpose specified comprising a record member, combined supporting and driving means for said member, a sound carrying connection constantly engaging said record member, means normally holding said record member out of engagement with its combined supporting and driving means, means operable to lock said record member to said combined supporting and driving means, and electrically operable means for simultaneously actuating said holding means to release said member and said locking means to engage and hold same in engagement with said driving means.

6. The combination set forth in claim 5, and means comprising a driven tape having contact strips, and control means including members engaging with said contact strips to actuate said actuating means for the holding and locking means.

7. A combined sound recording and reproducer apparatus for the purpose specified comprising a pair of record members, separate combined supporting and driving means for each of said members, a sound-carrying connection for each of said members and constantly engaging the same, separate means normally holding each record member out of engagement with its combined supporting and driving means and comprising a plurality of laterally spaced elements, means for simultaneously engaging said record members with their combined supporting and driving means, and actuating means for said last named means.

8. A sound reproducing device comprising a pair of phonographs having separate simultaneously turned platens, plates mounted upon the platens, record containing disks mounted on the plates, a manifold having tone arms provided with reproducers in constant engagement with said disks, and magnets carried by said platens to substantially engage and attract said plates whereby to establish a driving connection between the platens and the plates.

9. A sound reproducing device comprising a pair of phonographs having separate simultaneously turned platens, plates mounted upon the platens, record containing disks mounted on the plates, a manifold having tone arms provided with reproducers engaging said disks, magnets carried by said platens to substantially engage and attract said plates whereby to establish a driving connection between the platens and the plates, the reproducers of said tone arms being in constant engagement with the associated disks, and magnets to lift said plates from driving engagement with said platens when it is desired to stop the turning of the plates.

JONAS H. HARVEY.